United States Patent Office 3,745,202
Patented July 10, 1973

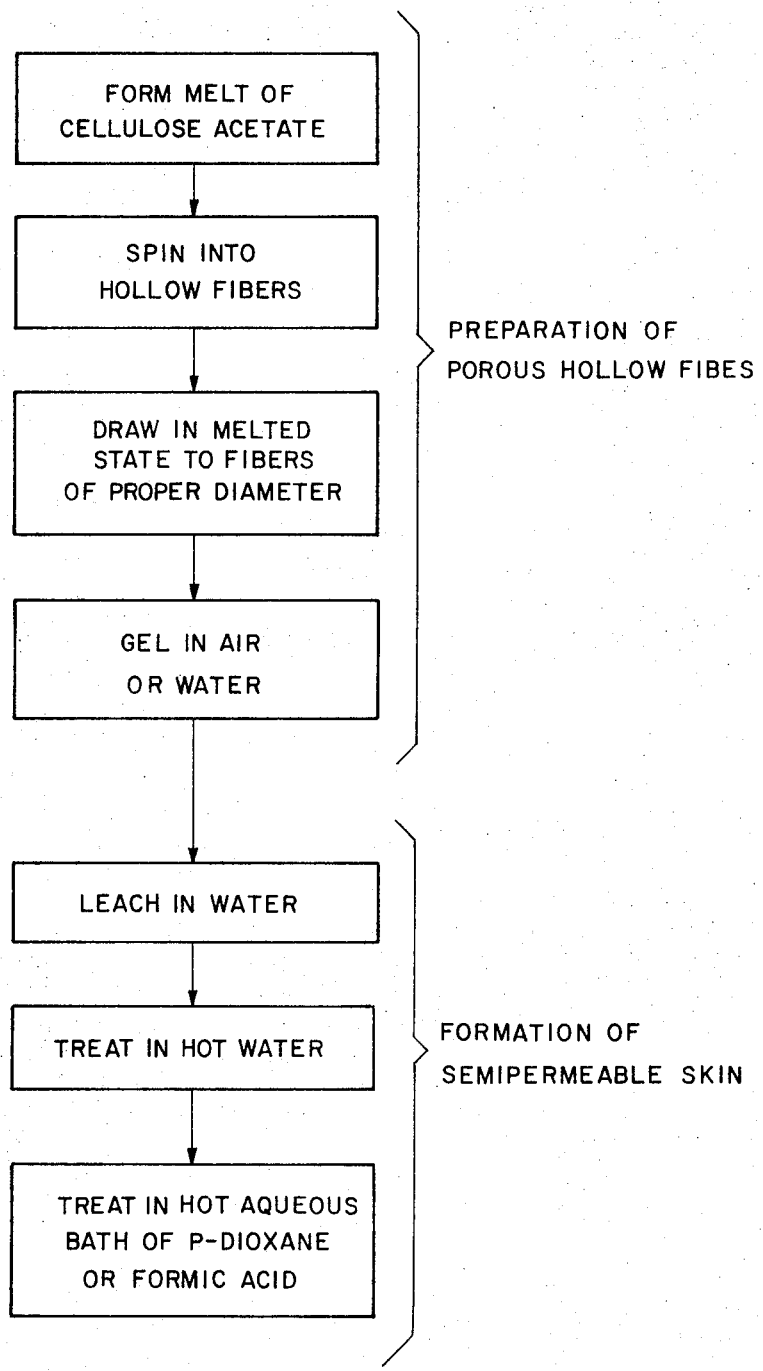

3,745,202
METHOD OF PREPARING AN ASYMMETRIC MEMBRANE FROM A CELLULOSE DERIVATIVE
Billy M. Riggleman and Mark E. Cohen, Cumberland, and Michael A. Grable, Frostburg, Md., assignors to the United States of America as represented by the Secretary of the Interior
Filed Mar. 17, 1971, Ser. No. 125,240
Int. Cl. B29d 27/00; C08b 29/10, 29/32
U.S. Cl. 264—41                             10 Claims

ABSTRACT OF THE DISCLOSURE

Asymmetric membranes are prepared from non-selective thermally gelled substrates of a cellulose derivative. After leaching, the substrate is annealed and then treated in a dilute aqueous solution of either p-dioxane, formic acid or nitromethane at an elevated temperature. The resulting semipermeable membrane is particularly suited for desalination by reverse osmosis.

BACKGROUND

For analytical, laboratory, and industrial purposes a variety of processes have been developed to separate materials from the liquids in which they are dissolved or suspended. Examples include distillation, filtration, liquid extraction, ion exchange, freezing, centrifuging and others. Many of these processes utilize differences in the properties of the materials being separated. Distillation, for instance, is successful in separating liquids with different boiling points and centrifuging separates materials of different densities.

One process has been found, however, which depends primarily on the unique properties of a semipermeable barrier which is called a membrane. For purposes of this specification a membrane may be defined as any barrier which is more permeable to solvent than to solute. The osmotic phenomenon has been observed when such a membrane is placed between a dilute and a concentrated solution. Pure solvent flows through the membrane and dilutes the more concentrated solution until the pressure difference across the barrier reaches a particular value—the osmotic pressure. Admittedly, this process merely succeeds in diluting the concentrated solution and concentrating the dilute solution. However, separation of solute and solvent can be achieved if the process is reversed. In reverse osmosis, therefore, a pressure greater than osmotic is applied to the concentrated solution to force pure solvent through the membrane into the dilute solution. This process has been extensively studied for the purification of saline water. By forcing a pressurized stream of salt water against a membrane pure water may be recovered from the other side.

To be economical a reverse osmosis desalination membrane must meet several requirements. First, the membrane must have adequate selectivity, i.e., it must distinguish between solvent and solute in allowing passage through it. The perfect membrane would allow the flow of solvent but would completely obstruct the passage of solute. The term usually used to quantify the selectivity is the percentage salt rejection defined as one hundred times the difference between the salt concentration of the brine feed and that of the product effluent divided by the salt concentration of the feed water.

Even if the reverse osmosis membrane demonstrates perfect selectivity, it will not be economical if pure water merely trickles through it. The second requirement, therefore, is that the membrane allows adequate product flux. The flux is measured by the volume of product flowing through a unit cross-sectional area of the membrane in a given time, for example in gallons per square foot per day (g.f.d.).

Finally, in a practical reverse osmosis separation, particularly desalination, it is important that the membrane exhibit adequate selectivity and flux for a reasonable time. If the membrane cannot meet this requirement, the frequent cost of shutting down the plant to clean, remove, restore, or replace the membranes would be prohibitive. Factors which may cause the degeneration of the membrane properties include fouling of the membrane surface by deposits, breaking or rupturing of the membrane and biological degradation of the membrane material. Compaction of the membrane by the high pressures used in reverse osmosis may also cause a reduction in the membrane porosity and a drastic reduction in the flux.

The first membrane which was found capable of desalination was of cellulose acetate. This membrane, generally employed in the form of a uniplanar sheet, is described as a "dense" membrane because of its uniform porosity. No matter which side of the membrane faces the feed solution its properties are the same. Although it is highly selective its chief drawback is that its flux is low making it uneconomical to build the huge equipment necessary to desalinize appreciable quantities of water.

A continuing search has been conducted to prepare improved membranes, for example, by adding fillers to the membrane to increase its porosity or by making the membrane as thin as possible. Although improved permeability has been achieved, there is a sacrifice in the selectivity of these membranes. Finally, Loeb and his co-workers discovered a method of preparing a "modified" cellulose acetate membrane as described, for example, in U.S. Pat. No. 3,133,132. The first step in this technique is to cast a solution of cellulose acetate as a thin film. Although the mechanism is not confirmed, it is believed that the dense membrane skin is initially formed by the evaporation of solvent from the film or the removal of solvent when the film is subsequently immersed in cold water. The membrane skin is perfected by a final annealing treatment in hot water.

The membranes prepared by this method are composed of two distinct layers—a thin dense semipermeable skin and a more porous nonselective support layer, both layers being of the same material usually cellulose acetate. Because of these distinct layers and the difference in membrane properties observed depending on which surface of the membrane faces the brine feed solution, this membrane has been described as "asymmetric."

In practical tests this membrane has shown exceptional selectivity and has a better flux than dense membranes. The reason for the improvement in the latter property has been attributed to the decrease in the thickness of the dense selective layer; the porous layer now provides sufficient structural support to withstand the operating pressures in reverse osmosis and offers little resistance to water flow. Unfortunately, this porous support has one drawback—because it is easily compacted by the pressure, the support layer becomes compressed, gradually loses some of its porosity, and hinders the free flow of pure water away from the product side of the membrane skin. Thus, asymmetric membranes fail to meet the third requirement of a suitable barrier; they do not maintain their properties for a reasonable time.

Another approach which has been taken is to offset the inherent problems of the membrane by judicious design methods. For example, the poor flux characteristics of the dense cellulose acetate membranes may be compensated for by designing a reverse osmosis apparatus with an extremely large membrane surface area per unit volume of equipment. One such apparatus is shown in U.S. Pat. 3,228,876 which utilizes bundles of hollow fiber membranes of the dense type. Although the flow rate through a unit area of membrane is low, the surface area of membrane used is so vast that relatively large amounts of water can be purified. Unfortunately, it has been impossible, heretofore, to form asymmetric membranes into hollow fiber tubes so that the advantages of high flux membranes and optimum design can be combined.

It is an object, therefore, of the present invention to produce membranes which meet the basic requirements of a reverse osmosis membrane.

It is a further object of this invention to produce a desalination system which combines the attributes of a a membrane meeting these requirements with optimum equipment design.

More specifically it is an object of this invention to produce asymmetric membranes in the form of fine hollow fibers.

The invention and the method of achieving these objects will be more thoroughly described in the following specification and drawing.

The figure illustrates the steps followed in preparing the membranes of our invention.

THE INVENTION

The objects of our invention have been achieved through our discovery that asymmetric membranes of cellulose acetate may be prepared by a process other than that of Loeb et al. Unlike the Loeb process in which the membrane is formed by solvent evaporation, the membranes of our invention are developed by changing the temperature of a melt of the membrane material. These thermally gelled asymmetric membranes are prepared in two steps—first, a porous thermally gelled substrate is prepared followed by the formation of a dense semipermeable skin on one side of the substrate.

The process of forming the asymmetric membranes is illustrated in the figure to which the reader is now referred. Initially, the membrane material is mixed with plasticizers at a temperature of about 100 to 200° C. to form a melt. Typically this melt will contain from about 15 to 75 weight percent polymer depending on the porosity and strength desired. It is significant that even at polymer concentrations as low as 25 percent, the hollow fibers produced can withstand external pressures of up to 1000 p.s.i. without collapsing. Suitable plasticizers which may be used alone or in combination with one another include benzyl acetate, triethylene glycol, ethylene glycol, diethylene glycol, tetraethylene glycol, polyethylene glycol, propylene glycol, dipropylene glycol, tripropylene glycol, Cellosolve (ethylene glycol monoethyl ether), butyl Cellosolve (ethylene glycol monobutyl ether), Carbitol (diethylene glycol monoethyl ether), butyl Carbitol (diethylene glycol monobutyl ether), methyl Carbitol (diethylene glycol monomethyl ether) and others.

The melt is then formed into a hollow fiber. Although the melt could be formed into flat sheets or any other appropriate shape, as mentioned previously, the design of hollow fibers is preferred because it allows the largest possible membrane surface area per volume of equipment.

Hollow fibers are spun from the melt by pumping or in some other suitable manner pushing the melt through an orifice designed to shape the melt into a hollow fiber. This can be achieved by having a needle extending into the circular opening through which the melt is forced. By pumping a gas through this needle the drawn fibers will be hollowed. The specific device used in our experiments is illustrated and described in Office of Saline Water Research and Development Progress Report No. 518 entitled "Second Report on Development of Improved Cellulose Acetate Membranes for Reverse Osmosis," at pages 62 to 65.

Typically, the outside diameter of the hollow fiber will be from about 15 to 41 mils with the wall thickness being approximately one-third of the outside diameter. These dimensions are subject to variation, however, since in the next step, as illustrated in the figure, the hollow fiber is drawn by stretching to the proper size. Depending on the draw ratio the hollow fibers may have a final outside diameter as small as from 3 to 10 mils up to the original diameter of the fibers. The wall thickness will continue to be about one third of the outside diameter.

The drawn fiber is then gelled by exposure to either air or water to cool the melt and consequently harden the fiber. Gelation may be characterized as any such cooling technique which transforms the melt into a more firm structure. Typically, this treatment is performed for less than one second, although the duration may be as much as several days. The temperature of the bath is usually room temperature as is the final temperature of the fiber. A dilute aqueous solution containing about 10% or less of the melt plasticizer may also be used as a gelation bath. The use of aqueous solutions may be particularly useful in tailoring the properties of the thermal gel. For example, incorporation of plasticizer in the gelation bath produces a more permeable gel.

The product of these steps is a porous hollow fiber which is suitable for supporting a semipermeable membrane but has no selectivity of its own. There are problems, however, in trying to form a composite asymmetric membrane by coating these fibers with a dense layer of polymer. As already mentioned, these dense polymers tend to have low flux properties. Furthermore, there are physical difficulties in attempting to cast a membrane on the porous surface of the fibers—polymer solution may step into the pores clogging the substrate or the membrane may be unsupported at spots, tending to rupture under the force of osmotic pressure.

We have now discovered that the porous thermally gelled hollow fiber may be treated to transform the surface into a membrane skin, thereby avoiding all the disadvantages of attempting to apply a separate membrane to the porous substrate.

Since the structure of a thermal gel is induced by heat transfer rather than mass transfer its porosity is expected to be relatively homogeneous in contrast to that of Loeb type membranes in which the rapid evolution of a volatile solvent from the surface of the membrane during casting forms a latent skin. Examination of thermally gelled fibers by electronmicroscopy reveals, however, that the pore size on the air exposed surface of the thermally gelled fibers is smaller than that in the substructure. Although plasticizers are nonvolatile, apparently during spinning some removal of plasticizer occurs, effecting either a reduction in the pore size at the membrane surface or surface tension forces which promote skin formation.

Although the thermally gelled hollow fibers are not selective, since a gradation in porosity exists it should be possible to tighten the latent skin by appropriate treatment without fully densifying the porous substructure. A technique was developed to form a membrane skin on the support surface without impairing the qualities of the porous fibers. The steps involved are illustrated in the figure as follows:

After the gelation of the hollow fiber it is leached in water to remove any remaining plasticizer. Since the gelation may be carried out in water, a separate leaching step may not be necessary in all situations, i.e., water gelation will simultaneously effect leaching. Generally, however, a treatment in water at ambient temperature for at least about one hour should be effective in removing the plasticizer.

Subsequently the hollow fiber is exposed to hot water at a temperature of from 40 to 100° C. for from 2 seconds up to 20 minutes. Typically, this treatment is conducted for 10 minutes at a temperature of 60° C. Although the fibers do not exhibit selectively after this procedure, hot water treatment significantly increases their crystallinity and permeability.

Finally, the fibers are exposed to a hot solution of p-dioxane, formic acid, nitromethane or any other material having a high solvent action for the polymer used.

The concentration of the solution is generally less than 50 weight percent of the active ingredient and preferably from 5 to 20 percent. The treatment time ranges from less than 1 second to 10 minutes and the temperature of the solution is from 40 to 100° C. Typically, a treatment of about one minute in a 10 percent solution at 65° C. is quite effective. This last treatment develops a thin selective membrane skin. Membranes produced by this method are believed to be asymmetric because of their dye staining characteristics, their permeability and salt selectivity (permselectivity).

While the exact mechanism for the formation of this permselective skin is unknown, several factors in the manufacture of the hollow fibers have been isolated which favor the formation of a porosity gradient and the subsequent formation of the skin. These favorable factors are as follows:

(1) Plasticizers of greater solvent action (kinetically or thermodynamically) toward the polymer and those of increased volatility;
(2) Hotter spinning temperatures;
(3) Increased temperature difference between the melt and the gelation bath;
(4) Increase velocity of air past the membrane during spinning, and
(5) Water gelation rather than air gelation.

Optimization and control of these variables can enable one to vary the pore size of the membrane for the particular application.

While this description has basically referred to the formation of a membrane of cellulose acetate, in general, membranes may be formed by our process from cellulose derivatives selected from the group of cellulose esters, cellulose ethers, and mixed derivatives. Particularly, membranes may be prepared from cellulose acetate, cellulose diacetate, cellulose triacetate, cellulose nitrate, ethyl cellulose, and mixtures thereof.

Besides the desalination processes to which the foregoing has been directed it is also possible to employ the membranes formed by our invention in such processes as: the separation of water from electrolyte solutions including sea water, brackish water, acid mine water, and industrial brines and bitterns; the separation of organic liquids; the purification and concentration of liquid foods such as citrus juices, beer and syrups; and the purification of liquid wastes such as urine.

The invention will be more clearly described by the examples which follow although our invention is not to be limited to the specific features therein.

EXAMPLE 1

In connection with this example see accompanying Table 1.

In each test given in Table 1 a melt was prepared consisting of 30 weight percent cellulose acetate and 70 percent plasticizer. In series A tests the plasticizer was triethylene glycol, in series B tests it was a 3/1 mixture of triethylene glycol and methyl Carbitol, and in series C tests the plasticizer was a 1/1 mixture of triethylene glycol and methyl Carbitol. The melt was spun into hollow fibers of the dimensions given in Table 1, and without further drawing were gelled in water at 25° C.

Test A-1, B-1, and C-1 show the properties of the hollow fiber tubes at this time. All tests of the osmotic properties throughout this example were conducted at an applied pressure of 600 p.s.i.g. on the saline solutions indicated.

Tests A-2, B-2, and C-2 represent hollow fibers which having been prepared as mentioned were then further treated by leaching in water for about 1 hour at ambient temperature. Subsequently the fibers were heat treated in water at 60° C. for 10 minutes. The examples show that this further treatment increased the flux of the fibers but did not impart any selectivity.

Finally, tests A-3, B-3, C-3 and C-4 represent experiments on fibers which have been treated by all the steps indicated in the figure. Thus, having been heat treated in water some of the membranes were further treated in a 10% aqueous solution of p-dioxane at 66° C. for 1 minute. The osmotic properties indicate that the hollow fibers now have selectivity and in three of the four cases the salt rejection is greater than 91%. Although the membranes are less permeable than the nonselective fibers, the flux of the membranes might be further improved by drawing the spun fibers into thinner wall membranes. Reducing the thickness of the fiber would lessen the resistance of the membrane to the passage of water.

TABLE 1

| Test No. | Plasticizer composition | Fiber dimensions (mils) | | | Heat treatment (water) | Solvent treatment [1] | Feed solution (wt. percent NaCl) | Water flux (g.f.d.) | NaCl rejection percent |
|---|---|---|---|---|---|---|---|---|---|
| | | OD | ID | Wall | | | | | |
| A-1 | TEG [2] | 15 | 5 | 5 | No | No | 3.5 | 3.6 | 0 |
| A-2 | TEG | 15 | 5 | 5 | Yes | No | 3.5 | 5.2 | 0 |
| A-3 | TEG | 15 | 5 | 5 | Yes | Yes | 3.5 | 4.5 | 16.3 |
| B-1 | TEG/MeC,[3] 3/1 | 15 | 5 | 5 | No | No | 3.5 | 8.1 | 0 |
| B-2 | TEG/MeC, 3/1 | 17.5 | 6.0 | 5.25 | Yes | No | 0.5 | 14.2 | 0 |
| B-3 | TEG/MeC, 3/1 | 15 | 5 | 5 | Yes | Yes | 3.5 | 1.0 | 91.9 |
| C-1 | TEG/MeC, 1/1 | 15 | 5 | 5 | No | No | 3.5 | 6.9 | 0 |
| C-2 | TEG/MeC, 1/1 | 15 | 5 | 5 | Yes | No | 3.5 | 10.6 | 0 |
| C-3 | TEG/MeC, 1/1 | 15 | 5 | 5 | Yes | Yes | 3.5 | 0.45 | 96.1 |
| C-4 | TEG/MeC, 1/1 | 15 | 5 | 5 | Yes | Yes | 0.5 | 5.6 | 96.0 |

[1] Exposure to a 10% aqueous solution of p-dioxane at 66° C. for 1 minute.
[2] TEG = Triethylene glycol.
[3] MeC = Methyl Carbitol (diethylene glycol monomethyl ether).

EXAMPLE 2

A melt was prepared consisting of 30% cellulose acetate and 70% of a 3/1 mixture of triethylene glycol:methyl Carbitol. By the method of Example 1 this melt was spun and gelled into hollow fibers with an outside diameter of 20 mils. The fibers were treated in deionized water at 60° C. for 10 minutes followed by annealing in a 10% aqueous solution of nitromethane at 70° C. for 10 seconds.

The resulting membranes were stained by exposure to a 0.1 weight percent aqueous solution of Acridine Red for 1 minute. The membrane surface showed a very light stain, comparable to that of a commercial Loeb-type membrane capable of at least 90% salt rejection. After slight scraping of the surface, an intense stain resulted by the same procedure, illustrating that the selective portion of the membrane was very thin and that the structure was asymmetric.

EXAMPLE 3

Hollow fibers of an outside diameter of 20 mils were spun and gelled from a melt of the same composition as in Example 2. After treatment in deionized water at 60° C. for 10 minutes. the membranes were annealed at 70° C. for 1 minute in a 10% aqueous solution of formic acid.

Dye staining tests using Rhodamine B dye gave a very light stain on the membrane surface, indicative of a salt rejection of at least 90%. The membrane substructure exposed by light scraping showed a more intense stain. From comparison with Loeb-type control membranes, the hollow fiber membranes produced here were termed both highly selective and asymmetric.

EXAMPLE 4

Thermal gels were prepared of 25 and 35% ethyl cellulose with tripropylene glycol as the plasticizer. The gels were cast into flat sheet specimens approximately 5 mils in thickness. The sheets were treated in hot water and solvent annealed in a 15% aqueous solution of dioxane at 65° C. for 1 minute.

Dye staining tests using a 0.1% aqueous solution of Rhodamine B dye showed light staining indicative of a salt rejection in the range of 75–90%. When exposed by light scraping the membrane substructure stained intensely indicating highly porosity and membrane asymmetry.

EXAMPLE 5

Hollow fiber membranes with an outside diameter of 17 mils were spun at 60° C. from a mixture of 25% cellulose nitrate in diethylene glycol. The fibers were treated in a gelation bath at 50° C. and leached in water to remove plasticizer. Subsequently they were treated in hot water and solvent annealed for 1 minute in a 10% aqueous dioxane solution at 70° C.

The resulting membranes were exposed to a 0.1% Rhodamine B dye solution for 1 minute after which they were rinsed and examined with an ultraviolet light to determine stain intensity. There was essentially no stain on the membrane surface and an intense stain on sections that had been scraped lightly with a razor blade. This test indicated that the annealed membranes were salt selective and asymmertic.

While we have attempted to thoroughly describe our invention in the foregoing specification, it is apparent that modifications within the skill of the art may be made thereto without departing from the spirit of the invention. The scope of our invention is only to be limited by the claims which follow.

We claim:

1. A method of preparing an asymmetric membrane from a cellulose derivative selected from the group consisting of cellulose esters, cellulose ethers and mixed derivatives by the steps comprising:
   heating a mixture of said cellulose derivative and a plasticizer to form a hot melt.
   forming said melt into a membrane shape by extruding the hot melt into the shape of a thin hollow fiber and subsequently drawing the melted hollow fiber,
   cooling said melt to thereby gel said melt and produce a porous permeable substrate,
   leaching said permeable substrate to remove plasticizer therefrom and to produce a leached porous permeable substrate,
   exposing said leached substrate in hot water, and subsequently exposing said leached substrate to a hot dilute aqueous solution of a material selected from the group consisting of p-dioxane, formic acid, and nitromethane.

2. The method of claim 1 in which said cooling and said leaching are performed in a single step by immersing said melt in water at ambient temperature for at least one hour.

3. The method of claim 1 in which said cellulose derivative is a member of the group consisting of cellulose acetate, cellulose diacetate, cellulose triacetate, cellulose nitrate, ethyl cellulose, and mixtures thereof.

4. The method of claim 1 in which the step of exposing said leached substrate to hot water is effected by subjecting said leached substrate to water at a temperature from 40 to 100° C. for from 2 seconds to 20 minutes and
   the step of exposing said substrate to a hot dilute aqueous solution by subjecting said substrate to an aqueous solution of 5 to 20 percent p-dioxide for from less than 1 second to 10 minutes at a temperature within the range of 40 to 100° C.

5. The method of claim 1 in which the step of exposing said leached substrate to hot water is effected by subjecting said leached substrate to water at a temperature from 40 to 100° C. for from 2 seconds to 20 minutes and
   the step of exposing said substrate to a hot dilute aqueous solution is effected by subjecting said substrate to an aqueous solution of 5 to 20 percent formic acid for from less than 1 second to 10 minutes at a temperature within the range of 40 to 100° C.

6. The method of claim 1 in which the step of exposing said leached substrate to hot water is effected by subjecting said leached substrate to water at a temperature from 40 to 100° C. for from 2 seconds to 20 minutes and
   the step of exposing said substrate to a hot dilute aqueous solution is effected by subjecting said substrate to an aqueous solution of 5 to 20 percent nitromethane for from less than 1 second to 10 minutes at a temperature within the range of 40 to 100° C.

7. The method of claim 1 in which said cellulose derivative is cellulose acetate.

8. The method of claim 1 in which said cellulose derivative is cellulose nitrate.

9. The method of claim 1 in which said cellulose derivative is ethyl cellulose.

10. The method of claim 1 in which said plasticizer is selected from the group consisting of benzyl acetate, triethylene glycol, ethylene glycol, diethylene glycol, tetraethylene glycol, polyethylene glycol, propylene glycol, dipropylene glycol, tripropylene glycol, ethylene glycol monoethyl ether, ethylene glycol monobutyl ether, diethylene glycol monobutyl ether, diethylene glycol monoethyl ether, diethylene glycol monomethyl ether and mixtures thereof.

References Cited
UNITED STATES PATENTS

| | | | |
|---|---|---|---|
| 3,674,628 | 7/1972 | Fabre | 210—321 X |
| 3,423,491 | 1/1969 | McLain et al. | 264—49 |

OTHER REFERENCES

U.S. Office of Saline Water, Desalination Research Conference Proceedings: "Hollow Fibers as Membranes for Reverse Osmosis," by Henry I. Mahon, Dow Chemical Co., Washington, D.C. Nat. Academy of Sciences, Nat. Research Council, 1963, pp. 345–351, 264–49.

U.S. Office of Saline Water, "Second Report of Development of Improved Cellulose Acetate Membranes for Reverse Osmosis," by Mark E. Cohen et al., Research and Development Progress Report No. 518, March 1970, pp. 1–15.

PHILIP E. ANDERSON, Primary Examiner

U.S. Cl. X.R.

161—178; 210—321, 500; 264—48, 208, 209, 210 F, 341, Dig. 14